Dec. 6, 1949   W. B. KIRBY ET AL   2,490,218
BUTT HOOK AND LINK ASSEMBLY
Filed Oct. 29, 1948   2 Sheets-Sheet 1
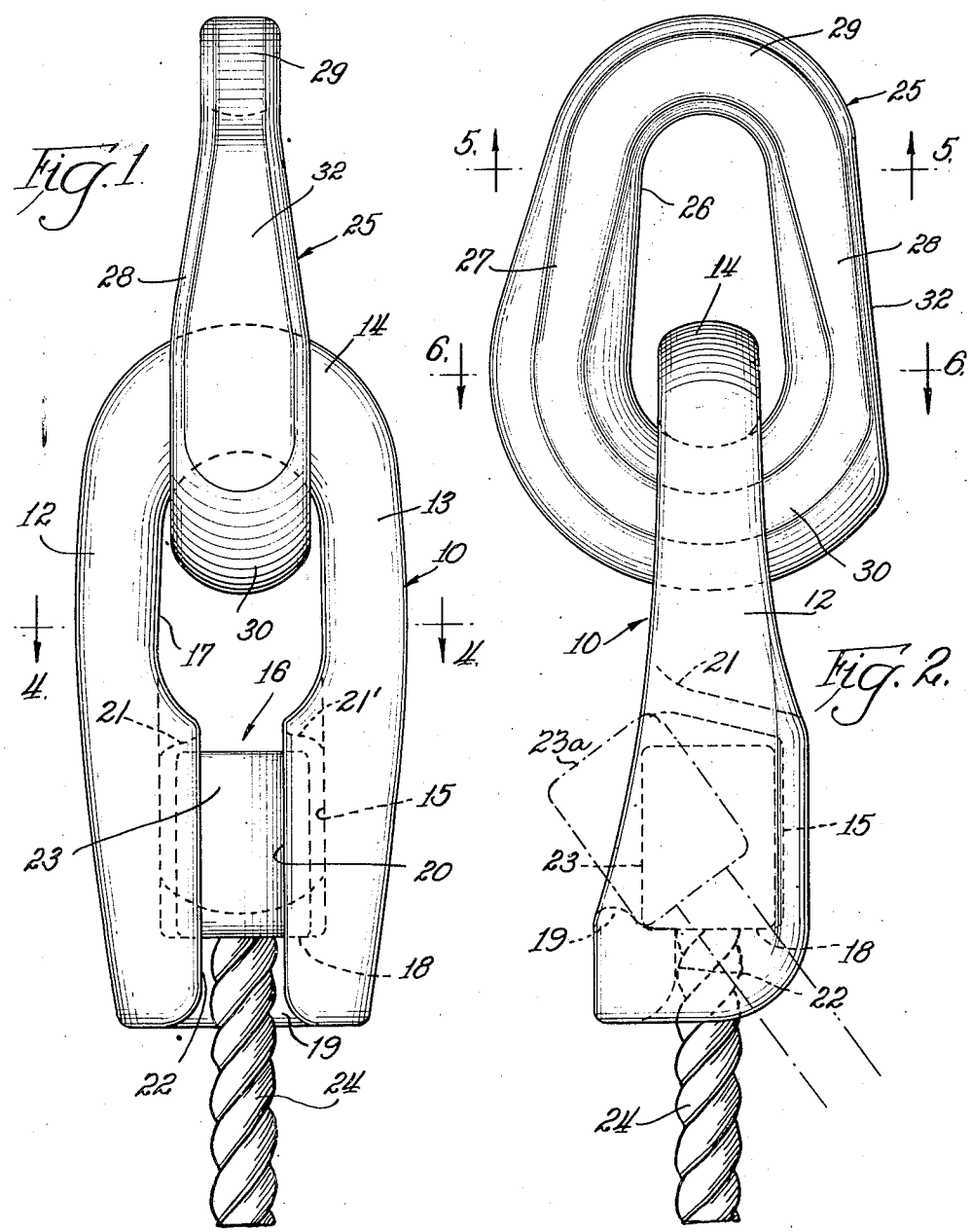
INVENTOR.
William B. Kirby & Erland V. Hill
BY Albert G. McCaleb
Atty Dec. 6, 1949  W. B. KIRBY ET AL  2,490,218
BUTT HOOK AND LINK ASSEMBLY
Filed Oct. 29, 1948  2 Sheets-Sheet 2

INVENTOR.
William B. Kirby & Erland V. Hill
BY
Albert G. McCaleb
Atty

Patented Dec. 6, 1949

2,490,218

UNITED STATES PATENT OFFICE 2,490,218

BUTT HOOK AND LINK ASSEMBLY

William B. Kirby, Portland, Oreg., and Erland V. Hill, Vancouver, Wash., assignors to Electric Steel Foundry, Portland, Oreg., a corporation of Oregon Application October 29, 1948, Serial No. 57,256

2 Claims. (Cl. 24—123)

This invention relates to butt hook and link assemblies, and more particularly to such assemblies employed on hauling lines in the logging industry, and the like.

One of the objects of our invention is to provide a butt hook and link assembly having parts constructed and arranged to prevent the accidental or unintentional escape of the ferrule on a choker cable or the like from the hook during use.

Our invention has for another object the provision of a butt hook and link assembly in which the butt hook structure is such that it tends to retain a cable ferrule in a socket of the butt hook and the link serves to prevent separation of the ferrule from the butt hook whenever there is any tension applied through the assembly.

In the preferred form of our invention, the removal of the cable ferrule from the butt hook requires the deliberate placement of the link attached to the butt hook, in the assembly, to a preselected position differing from that which it normally assumes when in use.

Other objects and advantages of the invention will be apparent from the following description and the accompanying drawings in which similar characters of reference indicate similar parts throughout the several views.

Referring to the two sheets of drawings;

Figs. 1 and 2 are respectively front and side elevational views of a butt hook and link assembly which embodies a preferred form of our invention, and which views each indicate the assembled relationship of a ferruled cable therewith;

Figure 5:
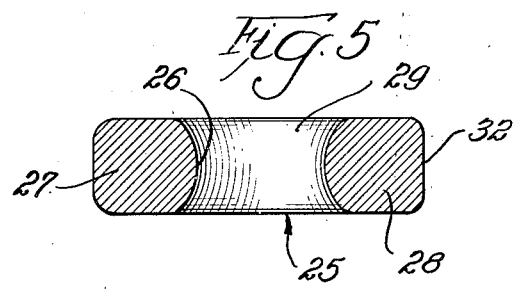
Figure 4:
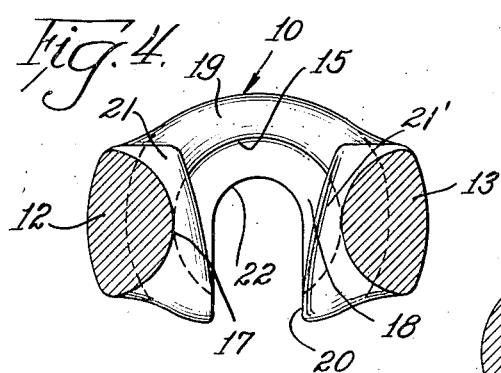
Figure 6:
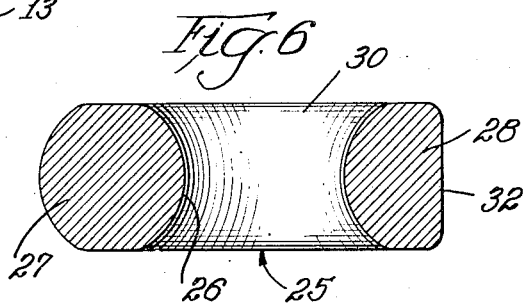

Fig. 4 is an end sectional view of the butt hook wherein the section is taken substantially on a line 4—4 of Fig. 1 and in the direction indicated by accompanying arrows; and Figs. 5 and 6 are respectively end sectional views of the link, wherein the sections are taken substantially as indicated by lines 5—5 and 6—6 of Fig. 2 and accompanying arrows.

Having reference to the accompanying drawings, wherein an exemplary embodiment of our invention is depicted for illustrative purposes, a butt hook 10 which is desirably elongated with reference to a longitudinal axis, and in the form of a closed loop, has side portions 12 and 13 joined at one end by an integral curved portion 14. At the end opposite the curved portion 14, the butt hook has integrally formed therein a ferrule receiving socket 15, having a restricted open end 16 which is adjacent and opens into an opening 17 defined by the sides and curved end of the butt hook. Opposite the restricted open end 16, the ferrule receiving socket is also restricted by a shoulder 18 integrally formed in the side portions 12 and 13 of the butt hook and an integral curved connecting portion 19 which connects the two side portions at said end of the butt hook. Along the front, as shown in Figs. 1 and 4, a slot 20 between the side portions 12 and 13 opens into and extends the full length of the ferrule receiving socket and adjoins a recess 22 at the end of the butt hook and interiorly of the shoulder 18.

The restriction of the end 16 of the ferrule socket opposite the shoulder 18 is effected by opposed flanges 21 and 21' on the inner surfaces of the side portions 12 and 13 respectively, which flanges project inwardly between the ferrule socket and the loop 17, and preferably recede in depth (Fig. 4) in a direction away from the slot 20. Also, as illustrated in dot and dash lines at 23a in Fig. 2, the ferrule is brought into, and removed from the socket through the side of that socket opposite the slot 20 and over the connecting portion 19. An angular motion, such as that depicted in dot and dash lines at 23a in Fig. 2, effects the passage of the ferrule beneath the opposed flanges 21 and 21' and over the connecting portion 19.

Figure 3:
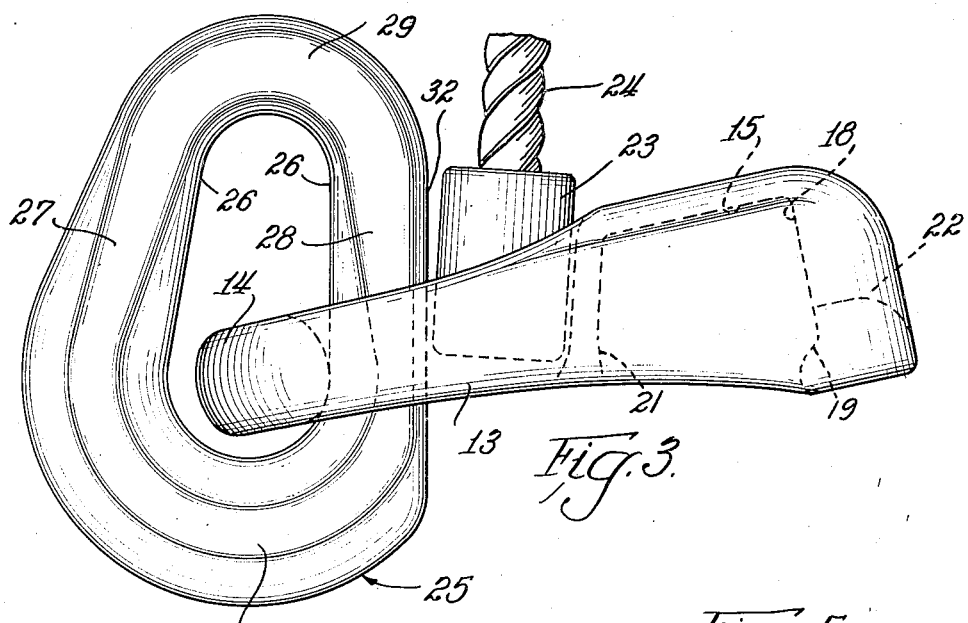
Fig. 3 is a side elevational view of the butt hook and link assembly shown in Figs. 1 and 2, but with the parts, including the ferruled cable, in different operating positions than those depicted in Figs. 1 and 2.

In the disclosed embodiment of our invention, the diameter of the ferrule receiving socket is substantially equal to the width of the adjacent opening 17. Such dimensions are, however, determined in relation to the dimensions of a ferrule, such as 23, adapted to be secured to the end of a cable 24 or the like with which our assembly is used. That is, the width of the opening 17 and the diameter of the ferrule receiving socket 15 are somewhat larger than the diameter of the ferrule, so that the ferrule may be inserted into and removed from the socket by movements thereof through the opening 17, as indicated in Fig. 3. The depth of the socket 15 is preferably such that when inserted the ferrule is completely included within the socket, as depicted in solid and dotted lines in Figs. 1 and 2. Upon insertion and removal of the ferrule, the cable 24 passes through the slot 20 and while connected thereto, the cable extends from the ferrule through the end recess 22 of the butt hook in substantial alignment with the longitudinal axis of the butt hook.

From the foregoing description, it may be readily understood that with the butt hook structure thus far described, the ferrule and cable may be readily and easily attached to or detached from the butt hook. As a safety factor, it is a purpose of our invention to provide an associated link structure which, in addition to being utilized for making a connection to the butt hook at the end opposite the ferrule receiving socket, also prevents the accidental or undesired disconnection of the ferruled cable 24 from the butt hook during use. To this end, we have provided a link 25 of unique construction which is inter-linked or inter-connected with the butt hook through opening 17.

In the disclosed embodiment of our invention, the link 25 comprises an integral closed loop defining an opening 26 which is preferably elongated with reference to a longitudinal axis; the closed loop including side portions 27 and 28 of the link integrally connected at their opposite ends by curved end portions or lights 29 and 30. The width of the opening 26 is such that the end portion 14 of the butt hook is free to turn and move about therein. Our preference for an elongated opening 26 in the link loop is brought about by a desire to provide a normal operating position for the link, as shown in Figs. 1 and 2, which it assumes with respect to the butt hook when tension is applied through the link 25 and cable 24.

In order to provide the aforementioned safety feature, which prevents the accidental release of the ferrule 23 from the socket 15, the sectional sizes and contours of portions of the link loop parts are so related to the size of the opening 17 in the butt hook that they prevent the passage of the ferrule from or to the socket, and particularly from the hook through that opening. In the present instance, the sectional dimensions and contours of the end portions 29 and 30 of the link and the side portion 27 thereof effect such restriction of the size of the open portion of the opening 17 adjacent the socket and opposed flanges 21 and 21' that the ferrule 23 cannot be passed therethrough. Thus, when the link is disposed in its normal position with the end portion 30 thereof adjacent the flanges 21 and 21', or when oppositely disposed from that normal position, as would be the case when tension is applied through the link and butt hook from either end of the link, the ferrule cannot pass through the opening 17 and escape from the butt hook. Even when the side 27 of the link faces the end of the socket, the ferrule cannot be passed through the opening 17. The side 28 of the link, however, is restricted in section, as depicted in Figs. 5 and 6, and, in the present instance, is shaped with a substantially flat or concavely curved outer surface 32 so that the dimensions and contours of that side portion permit the passage of the ferrule through the opening 17 when the surface 32 is disposed to face toward the socket. With the link thus constructed and proportioned with respect to the structure of the butt hook, it is quite apparent that the possibility of accidental removal of a ferruled cable from the butt hook is practically negligible and that such removal requires a conscious effort to position the link properly in relation to the butt hook and to effect the removal of the ferruled cable from the butt hook opening adjacent the one side portion of the link. On the other hand, the parts, when consciously moved, may be readily placed in and moved through their proper positions for quickly and easily effecting the connection and disconnection of a ferruled cable.

It may be understood from the foregoing description that the socket 15 is open through the side of the butt hook opposite the cable slot 20 and that the ferrule 23 can be admitted to the hook for entry into the socket only by passing same endwise through the butt hook opening 17 and then by an angular motion into the socket from the side of the socket opposite the cable slot. While the ferrule may be displaced from the socket when there is freedom for angular movement of the cable 24 and ferrule 23 relative to the butt hook, it cannot be wholly disconnected from the hook except by passage of same through the loop opening 17; it being readily understood that there is practically no freedom for such necessary angular movement during use.

While we have illustrated a preferred embodiment of our invention, many modifications may be made without departing from the spirit of the invention, and we do not wish to be limited to the precise details of construction set forth, but desire to avail ourselves of all changes within the scope of the appended claims.

Having thus described our invention, what we claim as new and desire to secure by Letters Patent of the United States, is:

1. A butt hook and link assembly for use on a hauling cable or the like having a ferrule secured to one end and comprising, in combination, an integrally formed butt hook including side portions and being configured to define a longitudinally elongated closed loop with a ferrule socket at one end thereof, said butt hook also having therein a longitudinal slot adjoining and extending along one side of the ferrule socket, and the ferrule socket being partially open on the side of the socket opposite the slot and adjacent the loop for the passage of the ferrule into and from the socket, said slot being of a transverse width less than that of the ferrule and large enough to pass the cable, said side portions of the butt hook having thereon opposed flanges projecting inwardly between the ferrule socket and said loop to restrict the end of the socket facing the loop so as to prevent direct movements of the ferrule between the socket and loop longitudinally of the butt hook, and an elongated closed link extending through the closed loop of the butt hook, the major portion of the link including one elongated side portion and an end portion which adjoins said one side portion, the other side portion of the link being restricted in section in one plane to an extent that it leaves space for the passage of the ferrule through the loop of the butt hook when the restricted side is positioned to face the socket therein.

2. A butt hook and link assembly for use on a hauling cable having a ferrule secured to one end thereof and comprising, in combination, an integrally formed butt hook including a pair of spaced and elongated side portions joined at adjacent ends respectively by a curved portion and a connecting web portion to form an elongated loop, means including said connecting web portion and opposed parts of the elongated side portions defining a ferrule receiving socket at one end of the elongated loop, which socket is adjoined by a longitudinal cable receiving slot and is open on the side opposite the slot and adjoining the loop for the passage of the ferrule into and from the socket, opposed flanges on the side portions extending transversely of the side portions and projecting inwardly thereof at the loop end of the slot to prevent the passage of the ferrule directly from the socket to the adjacent portion of the loop, and a link in the form of a closed loop interlinked with the butt hook in chain-like manner so that it extends through the loop thereof, the size of the loop of the butt hook and the sectional dimensions and shape of said link being so proportioned relative to one another that all but a relatively short portion of the link restricts the loop in the butt hook to an extent which prevents passage of the ferrule through said loop, and said relatively short portion of the link comprising a side thereof having its section reduced by the provision of a flattened surface thereon to leave space for the passage of the ferrule through the loop in the butt hook when said flattened surface is positioned opposite the socket in the butt hook.

WILLIAM B. KIRBY.
ERLAND V. HILL.

REFERENCES CITED

The following references are of record in the file of this patent:

UNITED STATES PATENTS

| Number | Name | Date |
|---|---|---|
| 1,464,161 | Wirkkala | Aug. 7, 1923 |
| 1,651,081 | Bardon | Nov. 29, 1927 |
| 1,653,092 | Draper | Dec. 20, 1927 |
| 1,656,676 | Mills | Jan. 17, 1928 |
| 1,669,152 | Yeaton | May 8, 1928 |
| 1,720,069 | Yeaton | July 9, 1929 |
| 1,803,401 | Nadeau | May 5, 1931 |